(12) United States Patent
Fida (10) Patent No.: US 11,766,633 B2
(45) Date of Patent: Sep. 26, 2023

(54) AIR FILTRATION UNIT

(71) Applicant: BLADE FILTERS INC., Markham (CA)

(72) Inventor: Joseph Fida, Markham (CA)

(73) Assignee: Blade Filters Inc., Markham (CA)

( * ) Notice: Subject to any disclaimer, the term of this patent is extended or adjusted under 35 U.S.C. 154(b) by 403 days.

(21) Appl. No.: 16/962,483

(22) PCT Filed: Oct. 1, 2018

(86) PCT No.: PCT/CA2018/051233
§ 371 (c)(1),
(2) Date: Jul. 15, 2020

(87) PCT Pub. No.: WO2019/136543
PCT Pub. Date: Jul. 18, 2019

(65) Prior Publication Data
US 2021/0077935 A1 Mar. 18, 2021

Related U.S. Application Data

(60) Provisional application No. 62/617,465, filed on Jan. 15, 2018.

(51) Int. Cl.
*B01D 46/24* (2006.01)
*B01D 46/00* (2022.01)
(Continued)

(52) U.S. Cl.
CPC ..... *B01D 46/2414* (2013.01); *B01D 46/0005* (2013.01); *B01D 46/4227* (2013.01);
(Continued)

(58) Field of Classification Search
CPC .......... B01D 46/2414; B01D 46/88; B01D 46/0005; B01D 46/4227; B01D 46/0036; B01D 46/601; B01D 2279/50
(Continued)

(56) References Cited

U.S. PATENT DOCUMENTS 2,214,737 A 9/1940 Dauphinee
3,710,562 A * 1/1973 McKenzie ........... B01D 46/521
55/498

(Continued)

FOREIGN PATENT DOCUMENTS

CN 105498378 4/2016
DE 202013102214 U1 8/2013
(Continued)

OTHER PUBLICATIONS

Camfil, "Camfil product catalogue 2015". Camfil, 2015, pp. 184 Nov. 20, 2018.
(Continued)

*Primary Examiner* — Robert A Hopkins
*Assistant Examiner* — Qianping He
(74) *Attorney, Agent, or Firm* — Ridout & Maybee LLP (57) ABSTRACT

An air filtration unit is provided with a replaceable media cartridge to reduce the time, material, and labour costs required to maintain the filtration system. A housing portion includes a mounting flange, a supporting frame, and a collar for receiving a replaceable media cartridge. The replaceable media cartridge slides into the frame. At least one cap ensures that air flows through the cartridge and may provide a handle for easy removal and replacement of the cartridge.

23 Claims, 13 Drawing Sheets

(51) Int. Cl.
  *B01D 46/42* (2006.01)
  *B01D 46/88* (2022.01)

(52) U.S. Cl.
  CPC .......... *B01D 46/88* (2022.01); *B01D 46/0036* (2013.01); *B01D 2265/06* (2013.01); *B01D 2279/50* (2013.01)

(58) Field of Classification Search
  USPC .......................................................... 55/357
  See application file for complete search history.

(56) References Cited

U.S. PATENT DOCUMENTS

| | | | | |
|---|---|---|---|---|
| 7,527,663 | B2* | 5/2009 | Riedo | A62C 4/00 |
| | | | | 55/467 |
| 2006/0175262 | A1 | 8/2006 | Martin | |
| 2006/0249027 | A1* | 11/2006 | Adolphsen | B01D 53/0415 |
| | | | | 96/134 |
| 2008/0086995 | A1 | 4/2008 | Westlund | |
| 2010/0243554 | A1* | 9/2010 | Herrin | B01D 29/21 |
| | | | | 210/485 |
| 2011/0000373 | A1 | 1/2011 | Crawford et al. | |
| 2013/0232934 | A1* | 9/2013 | Baseotto | B01D 46/521 |
| | | | | 55/502 |
| 2014/0137743 | A1 | 5/2014 | Reeh | |

FOREIGN PATENT DOCUMENTS

| | | |
|---|---|---|
| EP | 2353694 | 8/2011 |
| FR | 1060652 | 4/1954 |

OTHER PUBLICATIONS

Mountain Air (2017). "Filters/mountainair" (https://www.mountainairfilters.com/filters).

Source Book, "Filters, Fans and Accessories". Canfilters Group Inc., Catalog 002.

\* cited by examiner

AIR FILTRATION UNIT

TECHNICAL FIELD

The present invention relates to the field of air filtration units. More specifically, the present invention relates to air filtration units having replaceable media cartridges.

BACKGROUND

Air filtration units are used in various applications, ranging from small appliances, to automobiles, to heating and air conditioning systems. In general, an air filtration unit draws air through a filtration media in order to remove contaminants from the air stream.

In hydroponic and greenhouse facilities, air filters are used to reduce odors and control emissions from growing operations. Ambient air is circulated through activated charcoal in the filter and returned to the greenhouse or vented to the environment.

In a greenhouse or hydroponic setting, air is typically drawn into an air filtration unit through a "pre-filter" supported by an external mesh. The incoming air moves through a layer of activated charcoal and passes to a central chamber, where the purified air is drawn off for recirculation or venting to the environment. The filtration unit must be frequently replaced as the filter media is used up or becomes blocked with particulate matter. In many applications, the filtration unit is positioned overhead, making replacement more difficult.

Conventional filtration units are of unitary construction. Expired filters must therefore be disconnected from the ventilation system when being replaced. This often requires a time and labour-intensive process of detaching and reattaching the filter to the ventilation system using fasteners, clamps, duct tape, or the like. This is particularly difficult when the filtration unit is located in a hard to reach area, such as an overhead installation. The inability to recycle or re-use portions of the filtration unit also adds to the material cost of maintaining such filters. The time, material, and labour costs for the user are therefore significant.

SUMMARY OF THE INVENTION

The present invention provides an air filtration unit with a replaceable media cartridge to reduce the time, material, and labour costs required to maintain the filtration system and/or manufacture replacement parts.

In one broad aspect, the invention provides an air filtration unit comprising a removable media cartridge and a housing. The media cartridge has an inner mesh defining a central air passage extending along a longitudinal axis of the filtration unit, an outer mesh surrounding the inner mesh, which together with opposing end walls defines a chamber between the inner and outer mesh, filtration media disposed in the chamber, and at least one cap for closing off one end of the central air passage in the media cartridge. The housing has a mounting flange for attachment of the filtration unit to an air vent, and a collar for receiving the media cartridge.

In another broad aspect, the invention provides a removable media cartridge for use with an air filtration unit, the filtration unit having a mounting flange for attachment of the filtration unit to an air vent, and a collar for receiving the media cartridge. The media cartridge comprises an inner mesh defining a central air passage extending along a longitudinal axis of the filtration unit, an outer mesh surrounding the inner mesh, which together with opposing end walls defines a chamber between the inner and outer mesh, filtration media disposed in the chamber, and at least one cap for closing off one end of the central air passage in the media cartridge.

In some embodiments, the media cartridge may include an alignment flange for insertion into the mounting flange of the housing. In some applications, the media cartridge may be fastened to the collar of the housing.

In some embodiments, the housing further comprises a frame for supporting the media cartridge along the longitudinal axis. The frame may extend along the longitudinal axis for at least 50% of the length of the outer mesh or substantially the entire length of the outer mesh. The frame may be of mesh construction and/or surrounded by a pre-filter.

In some embodiments, the at least one cap may be fastened to the media cartridge and be re-usable, be of unitary construction with the media cartridge, be received by the frame (when present), and/or fastened to the frame (when present). The at least one cap may further comprise a handle for insertion or removal of the media cartridge from the housing.

In some embodiments, the filtration unit includes a second cap for closing off one end of the housing and the second cap may be fastened to the housing or be of unitary construction with the housing.

In some applications, the filtration media is granular activated charcoal and/or the filtration unit is for use in a greenhouse or hydroponic application.

In another broad aspect, the invention provides a method of installing an air filtration unit. The method comprises fastening a mounting flange on a housing of the filtration unit to an air vent, inserting a media cartridge into a collar of the housing, and fastening the media cartridge to the collar of the housing. In some embodiments, the method further includes the step of fastening a cap to the media cartridge.

In another broad aspect, the invention provides a method of replacing the filtration media in an air filtration unit. The method comprises unfastening an existing media cartridge from a collar of a housing of the filtration unit, withdrawing the existing media cartridge from the collar of the housing, inserting a replacement media cartridge into the collar of the housing; and, fastening the replacement media cartridge to the collar of the housing. In some embodiments, the method further comprises the step of unfastening a cap on the existing media cartridge and fastening the cap to the replacement media cartridge.

Directional references herein such as "up", "down", "horizontal" and the like are used purely for convenience of description and do not limit the scope of the invention described herein. Furthermore, any dimensions provided herein are presented merely by way of an example and unless otherwise specified do not limit the scope of the invention. Furthermore geometric terms such as "straight", "flat", "point" and the like are not intended to limit the invention to any specific level of geometric precision, but should instead be understood in the context of the invention taking into account normal manufacturing tolerances, as well as the functional requirements of products in the field of the invention.

BRIEF DESCRIPTION OF THE DRAWINGS

Similar reference numerals may have been used in different figures to denote similar components.

DETAILED DESCRIPTION

With reference to the above drawings, various examples will now be disclosed which illustrate, by way of example only, various embodiments of the invention contemplated herein.

Figure 1A:
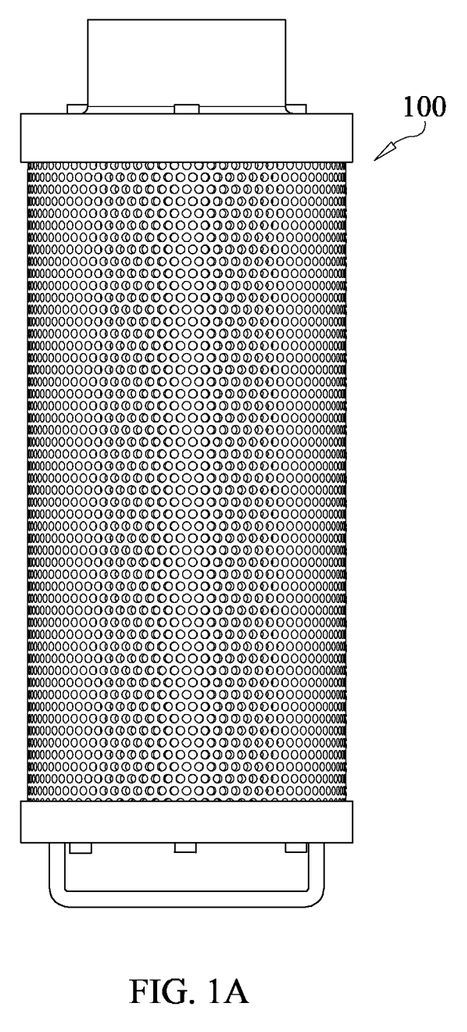
FIGS. 1A to 1D provide a front view (1A), an isometric view of the top (1B), a perspective view (1C), and an isometric view of the bottom (1D), respectively, of an embodiment of the present invention.
Figure 1B:
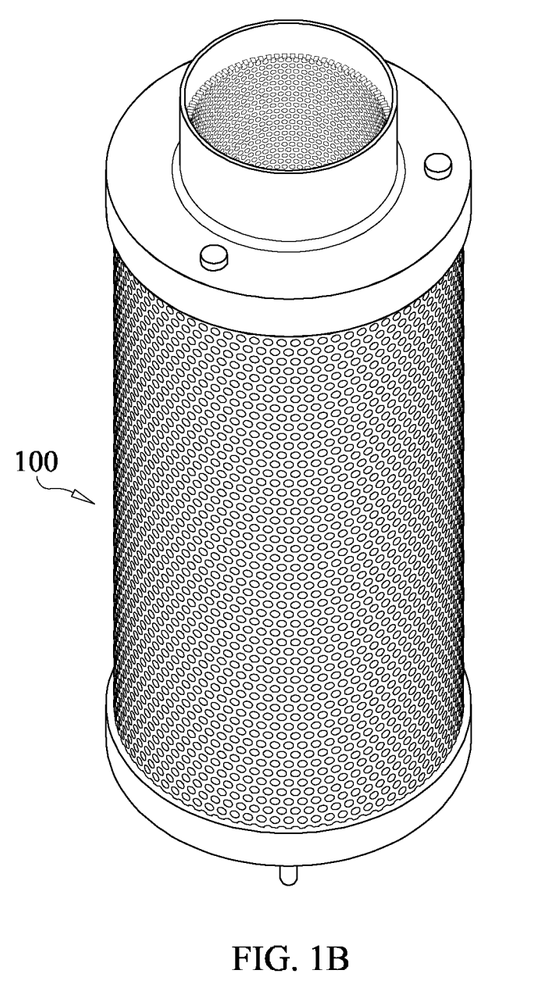
Figure 1C:
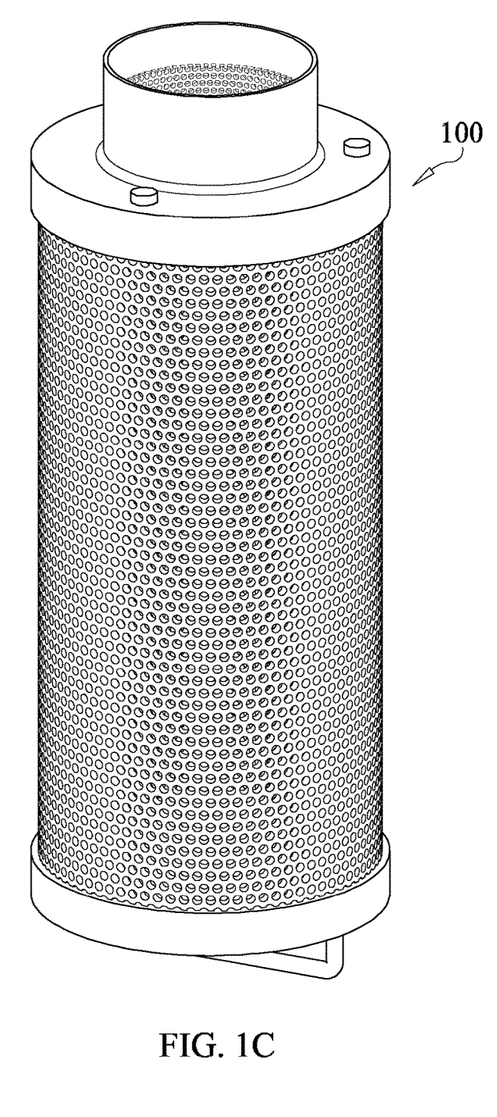
Figure 1D:
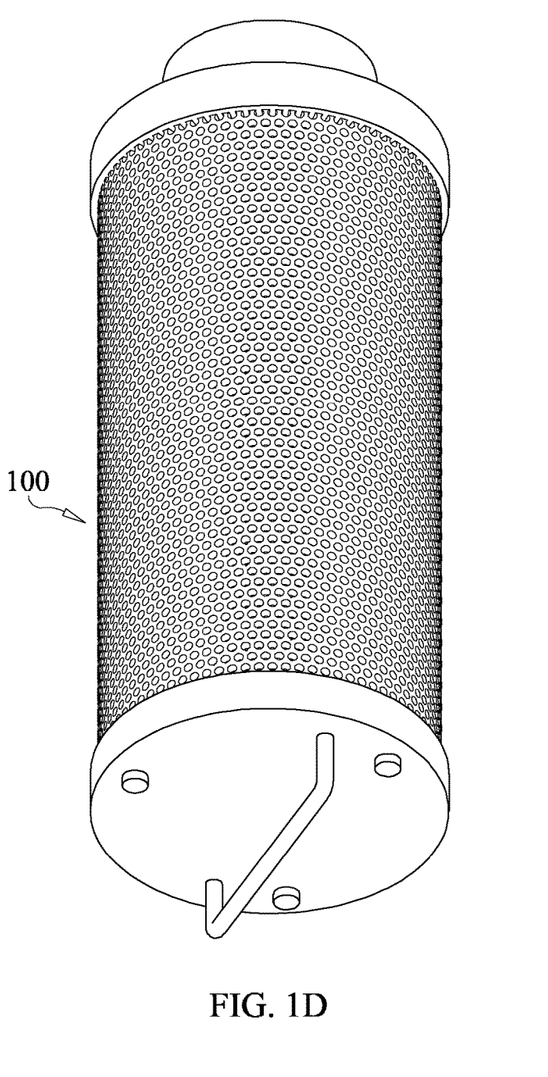
Figure 2:
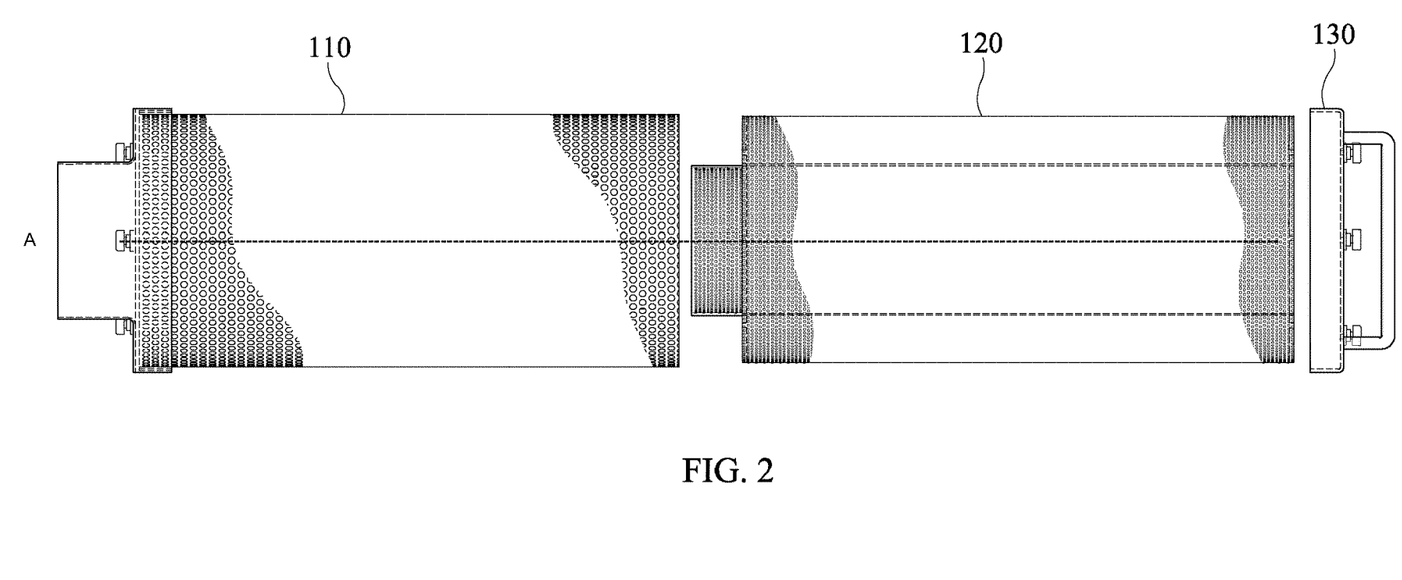
FIG. 2 is an exploded view side of a filtration unit according to an embodiment of the present invention, showing the housing, cartridge, and a cap.

FIGS. 1A to 6B provide a filtration unit 100 according to an embodiment of the present invention. As best seen in FIG. 2, the filtration unit 100 is generally comprised of a housing 110 which is mounted to a ventilation system (not shown), a replaceable media cartridge 120 which contains the filtration media (not shown), and a first cap 130.

Figure 3:
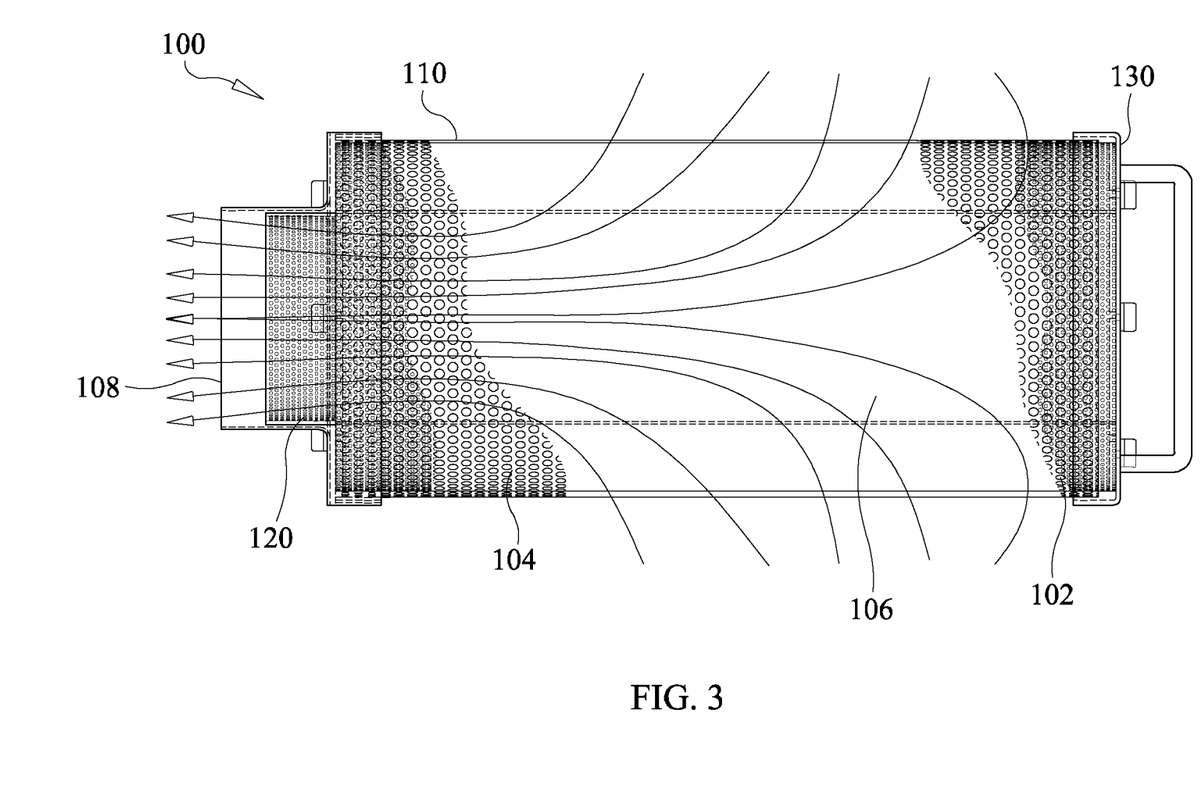
FIG. 3 provides a side view of the embodiment depicted in FIG. 1, in which internal components are shown with dashed lines and arrows are overlaid to indicate air flow through the filtration unit.

Turning to FIG. 3, unfiltered air enters the filtration unit 100 at a plurality of perforations 102 in the housing 110. Unfiltered air is drawn into the media cartridge 120, where it passes through filtration media (not shown). Filtered air then enters a central air passage 106 and exits at an outlet 108. The cap 130 prevents unfiltered air from directly entering the central air passage 106 and ensures that filtered air exits at the outlet 108. As discussed further below, the air flow in some embodiments may be reversed.

Figure 4A:
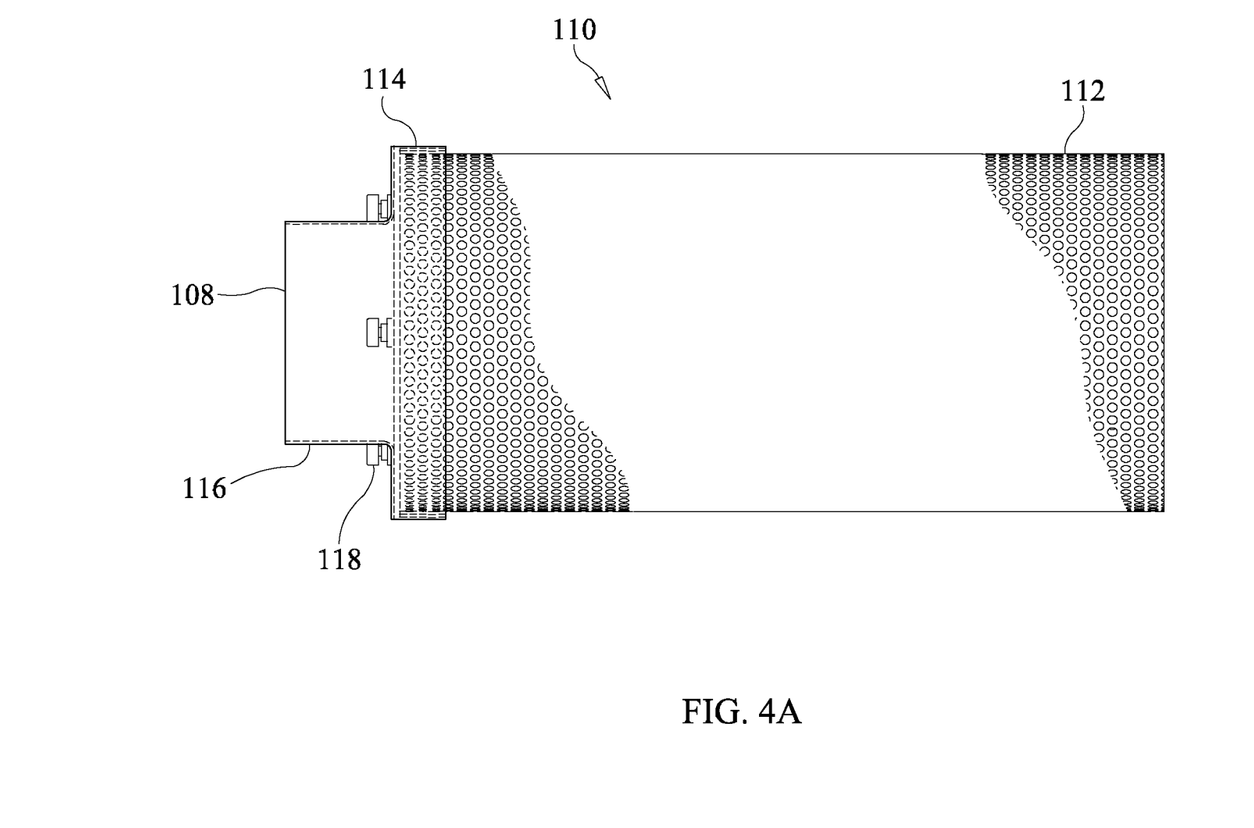
FIG. 4A is a side view of a housing according to an embodiment of the present invention.
Figure 4B:
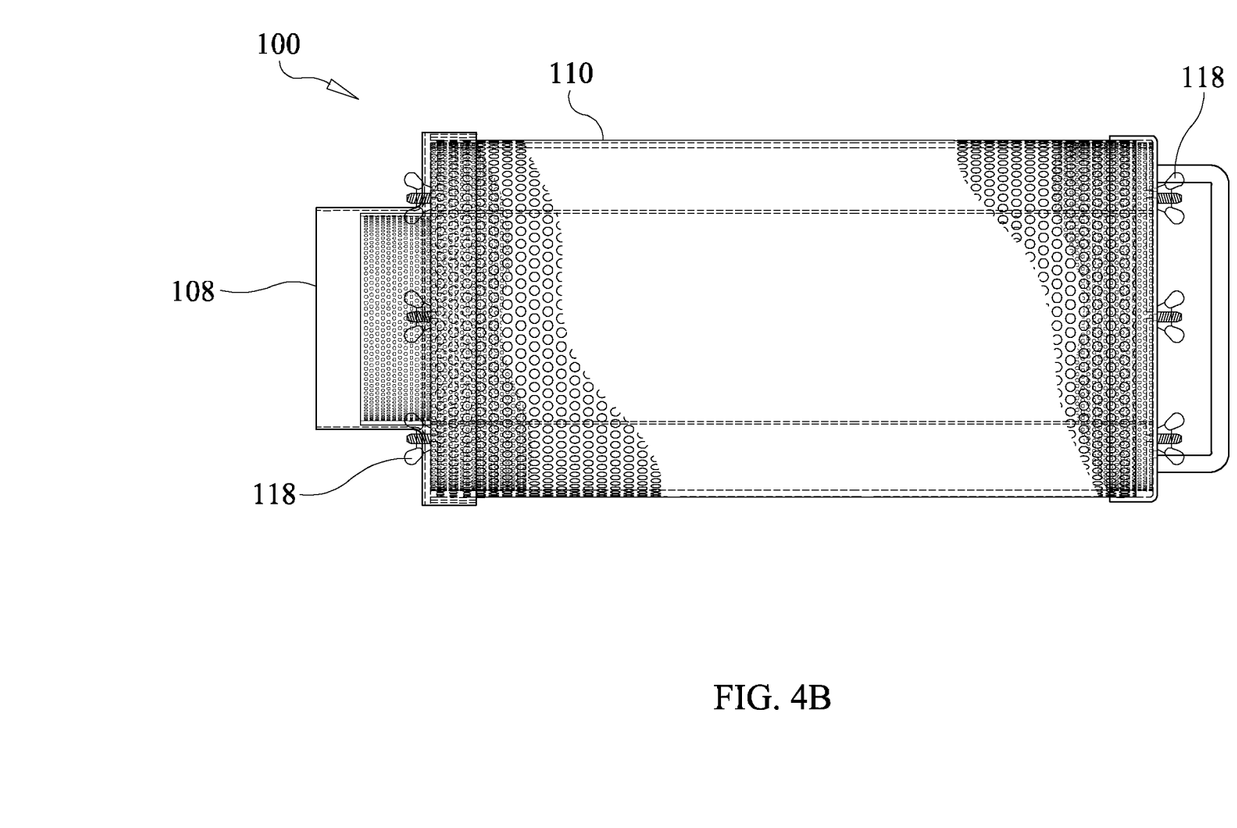
FIG. 4B is a side view of a filtration unit according FIG. 2 showing a second fastener.

FIG. 4A provides a housing 110 according to an embodiment of the invention, which is generally comprised of a frame 112, a collar 114, and a mounting flange 116. The mounting flange 116 connects the outlet 108 of the filtration unit 100 to the ventilation system (not shown). The collar 114 receives the media cartridge 120.

The frame 112 extends outward from the collar 114 along longitudinal axis A and supports the weight of the media cartridge 120 along all or part of its length. In this embodiment, the frame 112 supports substantially all of the length of the media cartridge 120. Such support helps to retain the media cartridge 120 in the housing 110 when the filtration unit 100 is in use and further assists the user when sliding the media cartridge 120 in or out of the housing 110, in the manner described below. In some embodiments, the frame 112 also supports a pre-filter (not shown), which surrounds the frame 112 and removes large particles before they enter the filter media.

Figure 5A:
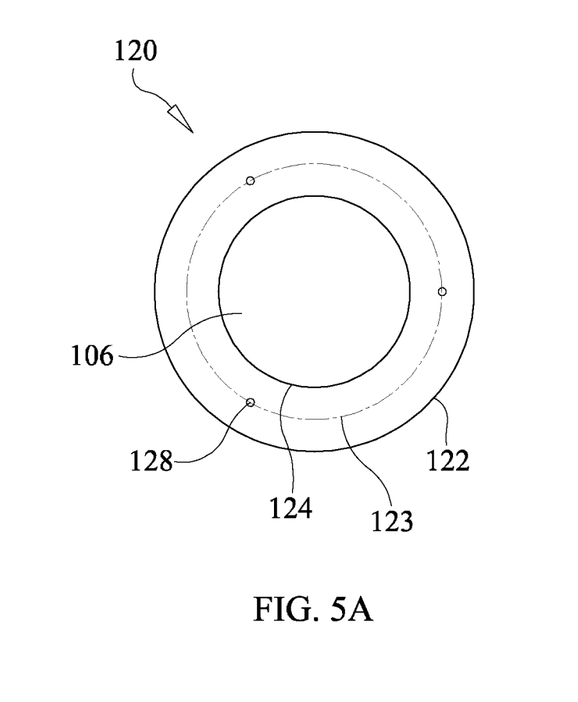
FIGS. 5A and 5B are a top (5A) and side (5B) view of a media cartridge according to an embodiment of the present invention.
Figure 5B:
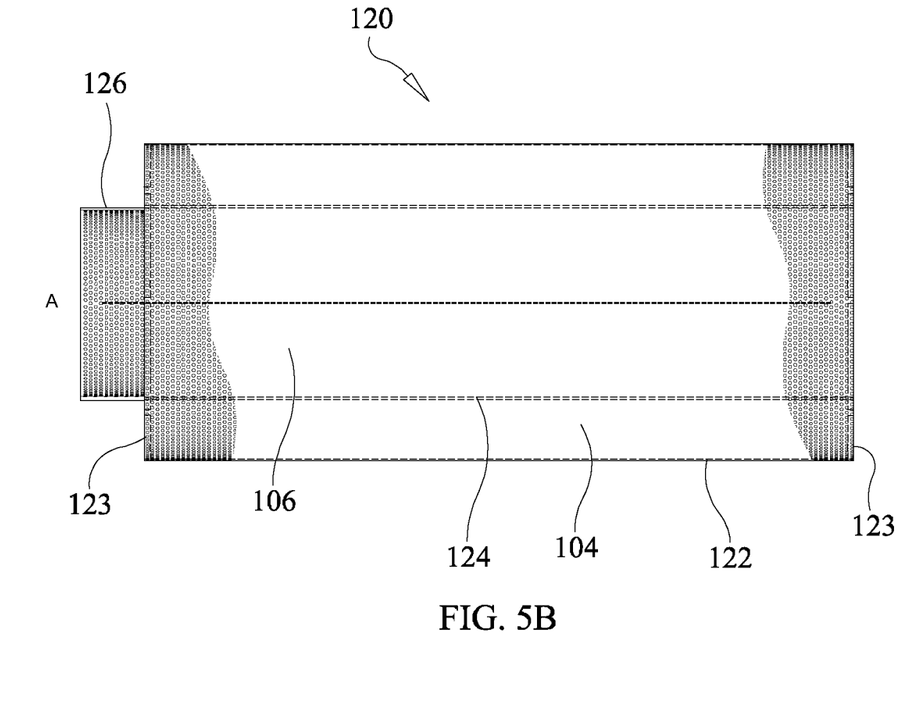

FIGS. 5A and 5B provide a media cartridge 120 according to an embodiment of the invention, which is generally comprised of an outer mesh 122, an inner mesh 124 defining a central air passage 106, and a pair of opposed end walls 123. In this embodiment, the inner mesh 22 and outer mesh 124 are constructed from perforated sheet metal and are arranged as concentric cylinders along longitudinal axis A. The space between the inner mesh 124, outer mesh 122, and end walls 123 defines the media chamber 104, which contains the filter media (not shown).

In the embodiment shown in FIGS. 5A and 5B, a portion of the inner mesh 124 extends beyond the outer mesh 122 to form an alignment flange 126. The alignment flange 126 enters the mounting flange 116 and thereby helps to align the cartridge 120 with the collar 114 when the user is assembling the filtration unit 100. In embodiments where the media cartridge 120 is fastened to the collar 114, the alignment flange 126 may also assist in aligning one or more fasteners (e.g. 118) with corresponding attachments points (e.g. 128) on the media cartridge 120 and/or in ensuring that the cartridge 120 is not mated with the collar 114 at an angle, for a flush fitting.

Figure 6A:
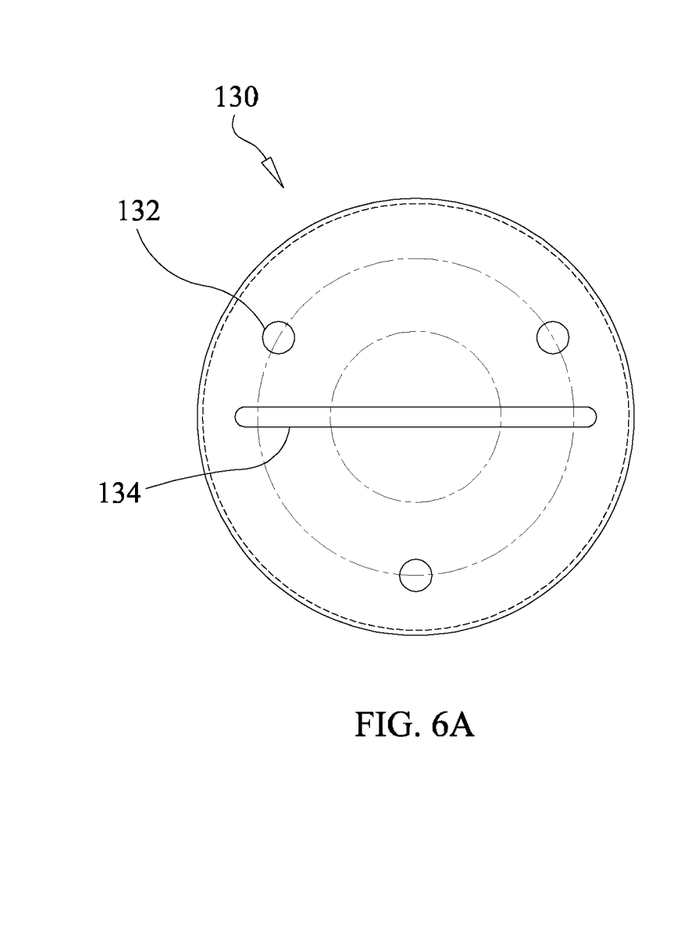
FIGS. 6A and 6B are a top (6A) and side (6B) view of a cap according to an embodiment of the present invention.
Figure 6B:
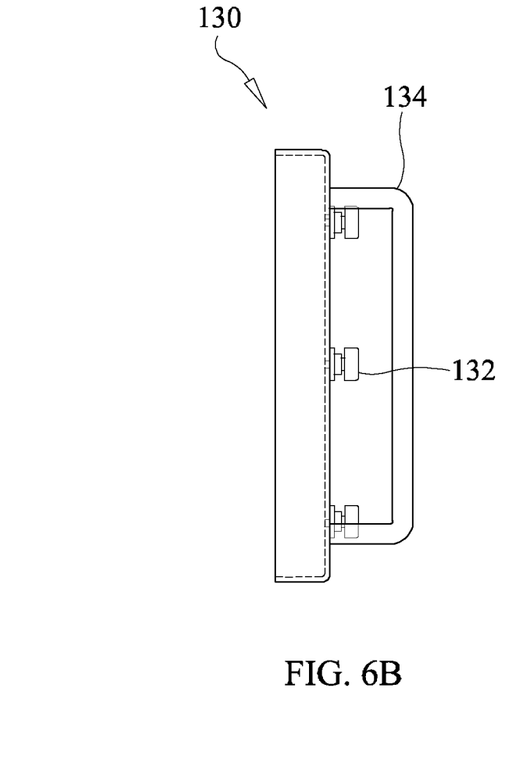

FIGS. 6A and 6B provide a first cap 130 according to an embodiment of the present invention. In this embodiment, a handle 134 is provided that can be used to remove the media cartridge 120 from the housing 110 of the filtration unit 100. As discussed further below, the cap depicted in FIGS. 6A and 6B is also re-usable, which reduces the material costs of maintaining and operating the filtration unit 100. As discussed further below, various other configurations of the cap 130 are also contemplated.

Installation of the air filtration unit 100 shown in FIGS. 1A to 6B begins by attaching the mounting flange 116 on the housing 110 to a ventilation system, using duct tape, fasteners, or the like. Since the housing 110 does not need to be removed to replace the media cartridge 120, this attachment can be more robust than in conventional air filters. The cap 130 is then fastened to the media cartridge 120, using fasteners 132 (e.g. spring-loaded captive panel screws as shown in FIG. 4A and wing nut screws as shown in FIG. 4B) that engage attachment points 128 on an end wall 123 of the media cartridge. The user then slides the assembled cap 130 and cartridge 120 assembly into the frame 112 of the housing 110, along axis A, until the media cartridge 120 is received by the collar 114. The media cartridge 120 is then fastened to the collar 114 of the housing 110 using fasteners 118 (e.g. spring-loaded captive panel screws as shown in FIG. 4A and wing nut screws as shown in FIG. 4B), which engage attachment points 128 on the opposite end wall 123 of the media cartridge 120.

When the media in the media chamber 104 has expired or become fouled, the user loosens fasteners 118 on the housing 110 and slides the media cartridge 120 along axis A to remove it from the frame 112. The cap 130 is then removed from the media cartridge 120 by loosening fasteners 132 and attached to a new media cartridge 120. The new media cartridge 120 is then re-inserted into the housing 100, in the manner described above.

Figure 7:
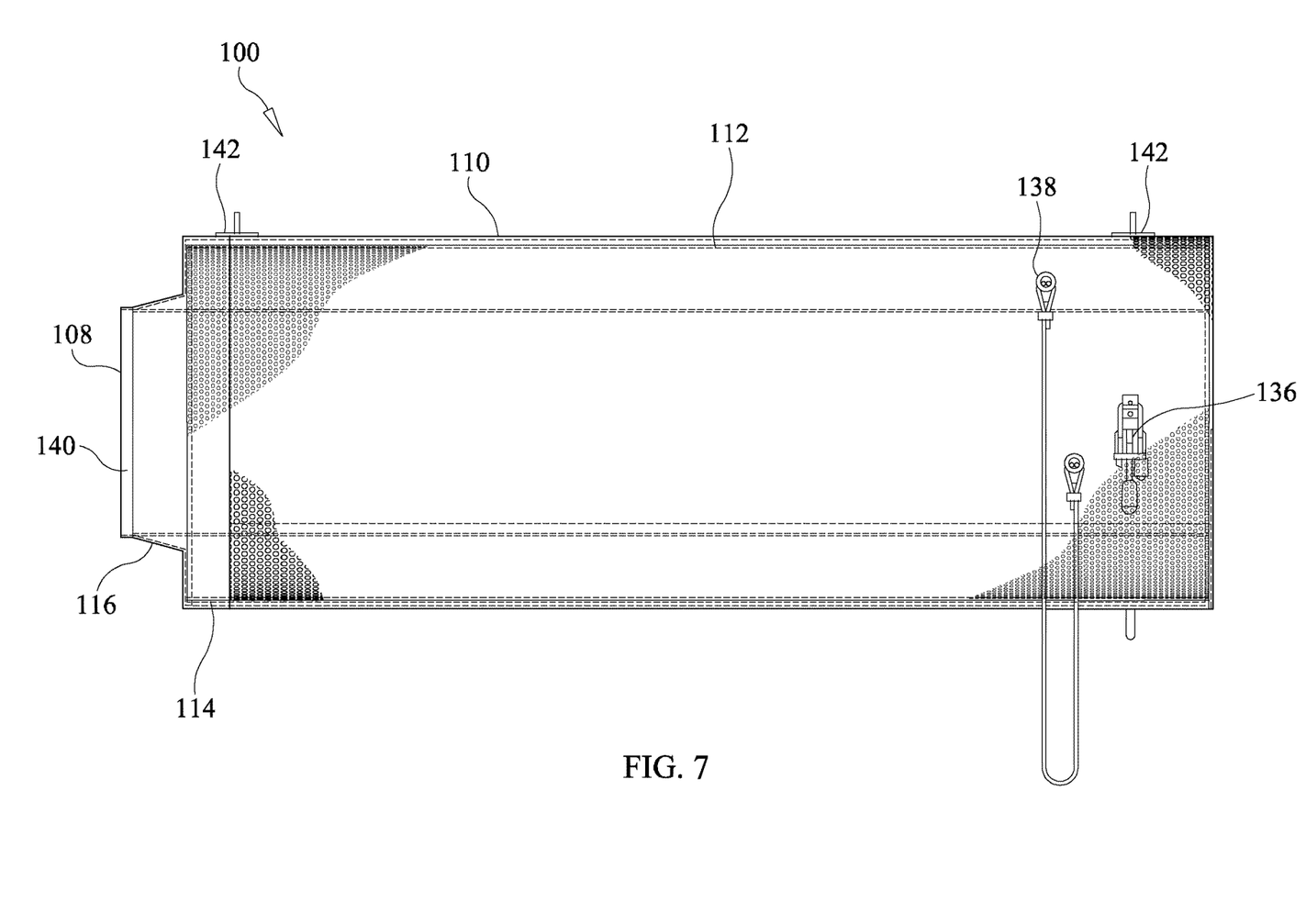
FIG. 7 is a side view of a filtration unit according to another embodiment of the present invention, showing the housing and cartridge.
Figure 8A:
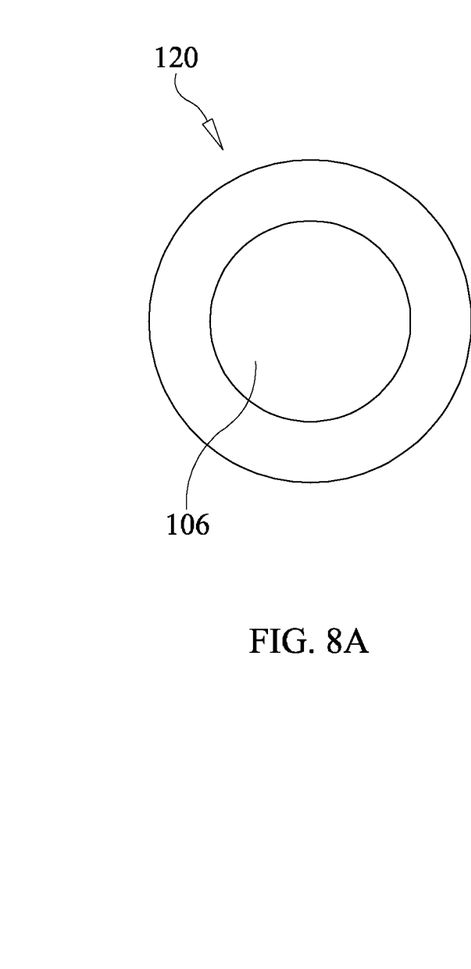
FIGS. 8A and 8B are a top (8A) and side (8B) view of a media cartridge according to an embodiment of the present invention.
Figure 8B:
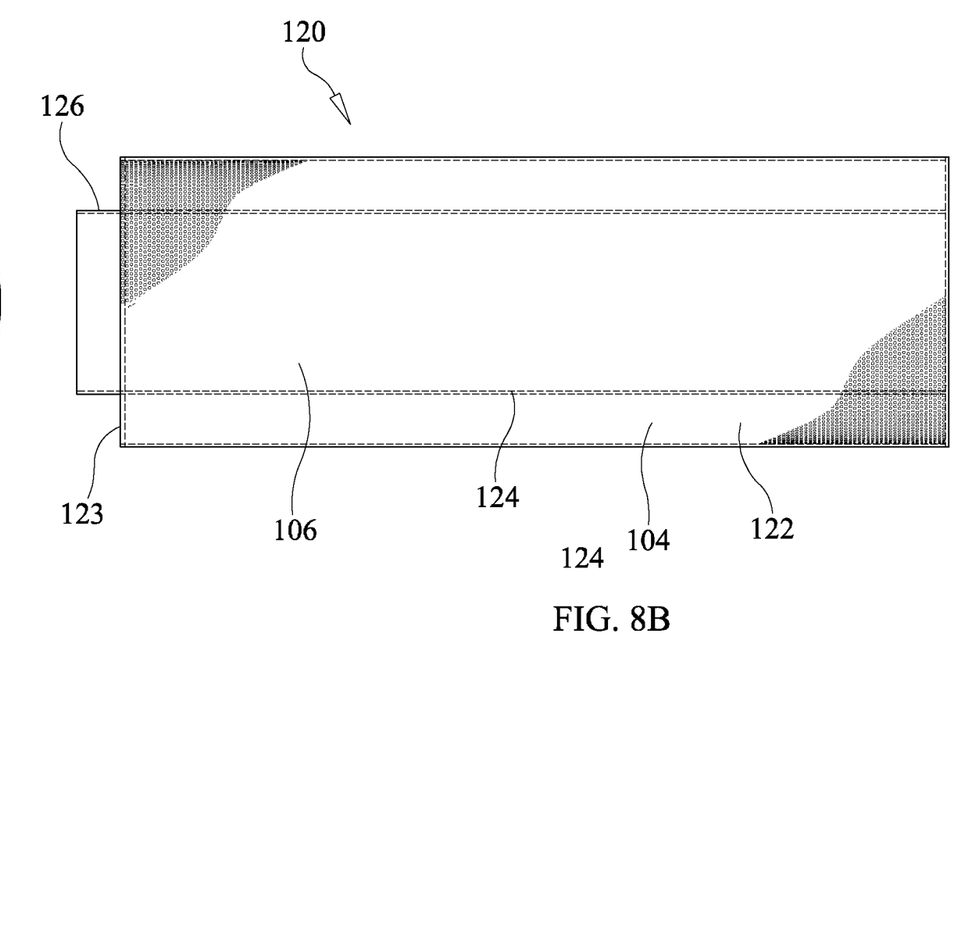
Figure 9A:
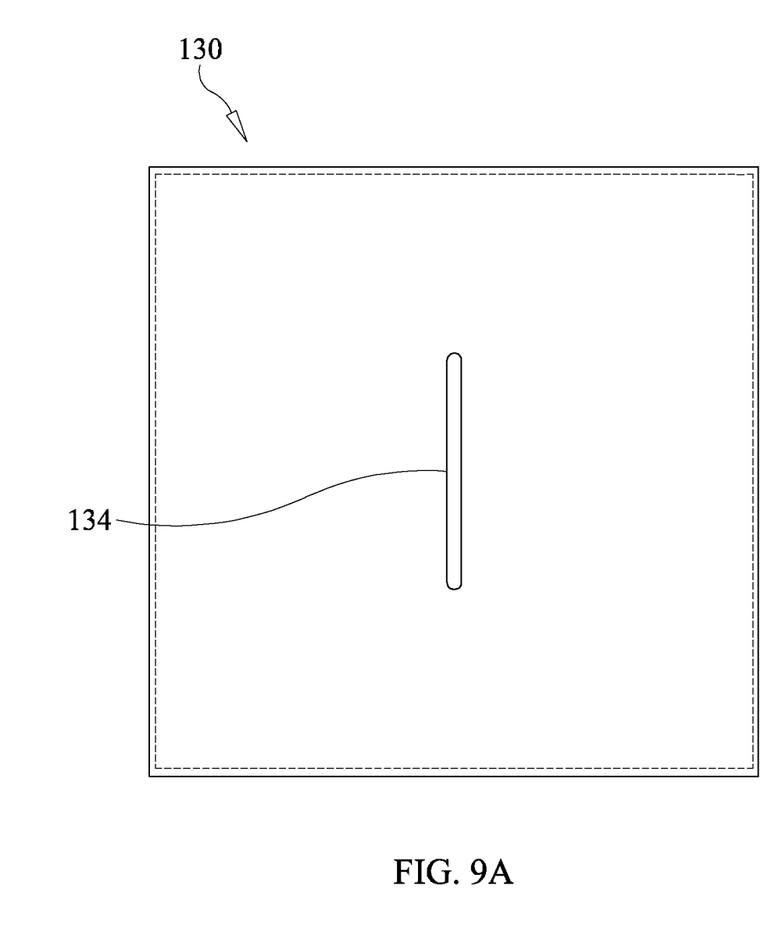
FIGS. 9A and 9B are a top (9A) and side (9B) view of a cap according to another embodiment of the present invention.
Figure 9B:
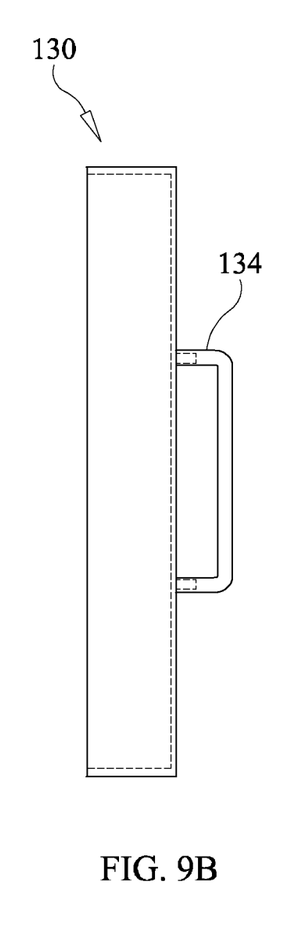

FIGS. 7 to 9B show an alternate embodiment of a filtration unit 100 showing an alternate embodiment of housing 110. In this embodiment, the filtration unit 100 is configured to be mountable to a ceiling or other roof structure. In the embodiment shown in FIGS. 7 to 9B, the filtration unit 100, housing 110 is similar to a rectangular cube, and is comprised of perforated stainless steel, and includes a frame 112 and a collar 114. In this embodiment, cap 130 has a square face and in one embodiment, for example and without limitation, made of stainless steel. In this embodiment, as shown in FIG. 7, mounting flange 116 is round and centrally located on a second cap 140 that is connected to mounting flange 116.

As seen in FIG. 7, in this embodiment, housing 110 is divided into two sections along its longitudinal axis A with a lower half forming a cradle for cartridge 120. In this embodiment, cartridge 120 is replaceable by removing the cap 130 with handle 134 and disengaging toggle clamps 136, one on each side of the unit 100. The lower half of housing 110 can then be removed by pivoting the housing 110 around a hinge or other hinge means disposed on the second cap 140 attached to mounting flange 116.

Two steel cables 138 attached to the upper and lower halves of the housing 110 respectively are disposed on each side of the unit 100. Once the bottom half of housing 110 has been lowered, cartridge 120 can be replaced. Toggle clamps 136 are then re-engaged and the remaining components are secured as described above. In this embodiment, the housing 110 can be, for example and without limitation, welded to a second cap 140 to fully secure housing 110. To attach unit 100 to a ceiling or other roof structure, unit 100 may include one or more attachment points. In the embodiment shown in FIGS. 7 to 9B, unit 100 includes four mounting lugs 142 that are attached to housing 110, for example at the corners of housing 110 and which secure unit 100 to the ceiling or other roof structure.

Figure 10:
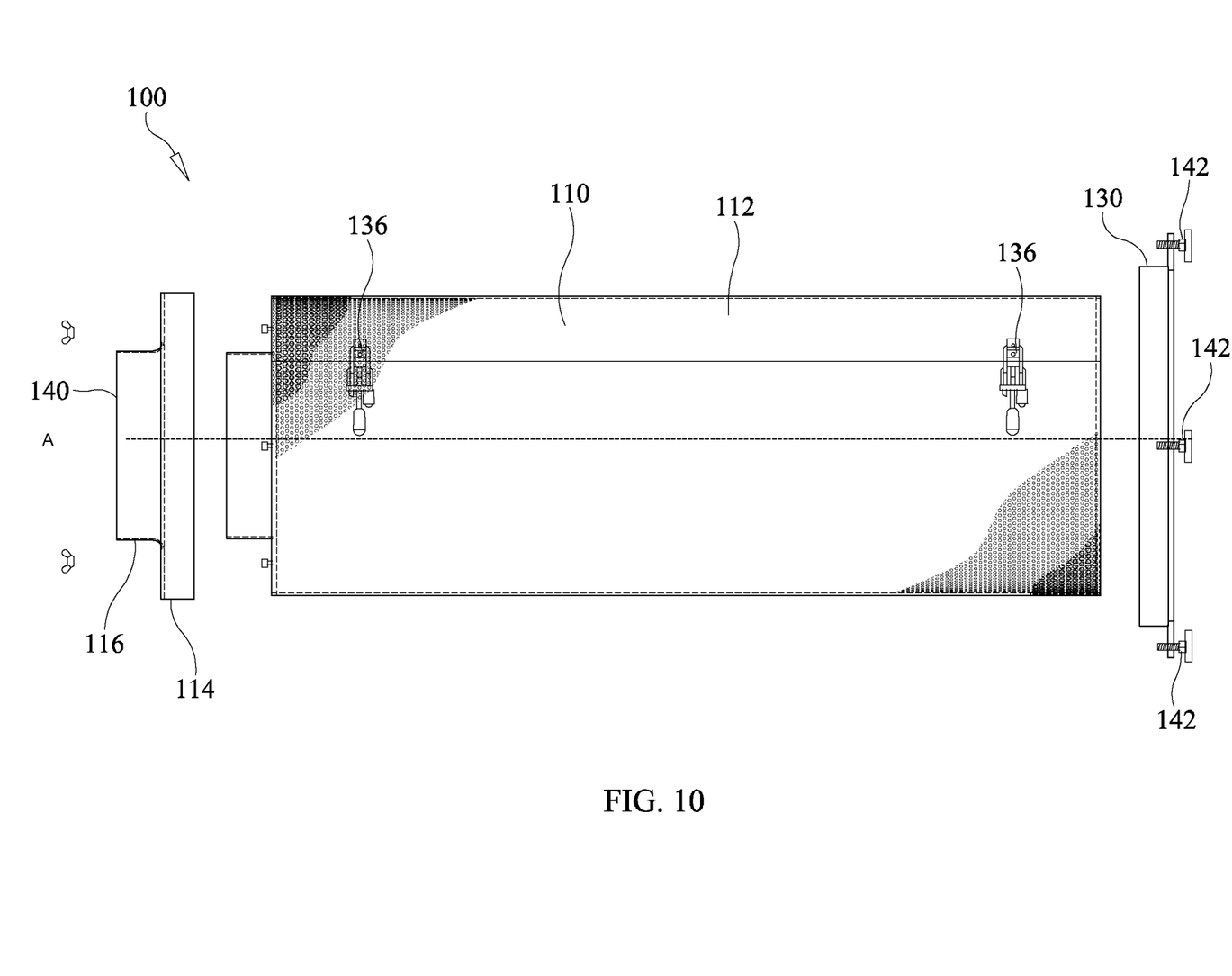
FIG. 10 is an exploded side view of a filtration unit according to another embodiment of the present invention, showing the housing, cartridge, and cap.
Figure 11A:
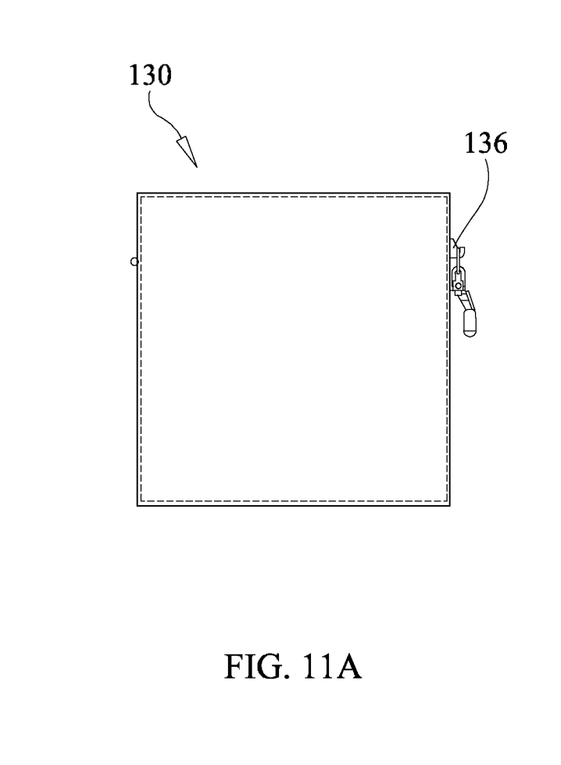
FIGS. 11A and 11B are a top (11A) and side (11B) view of a media cartridge according to an embodiment of the present invention.
Figure 11B:
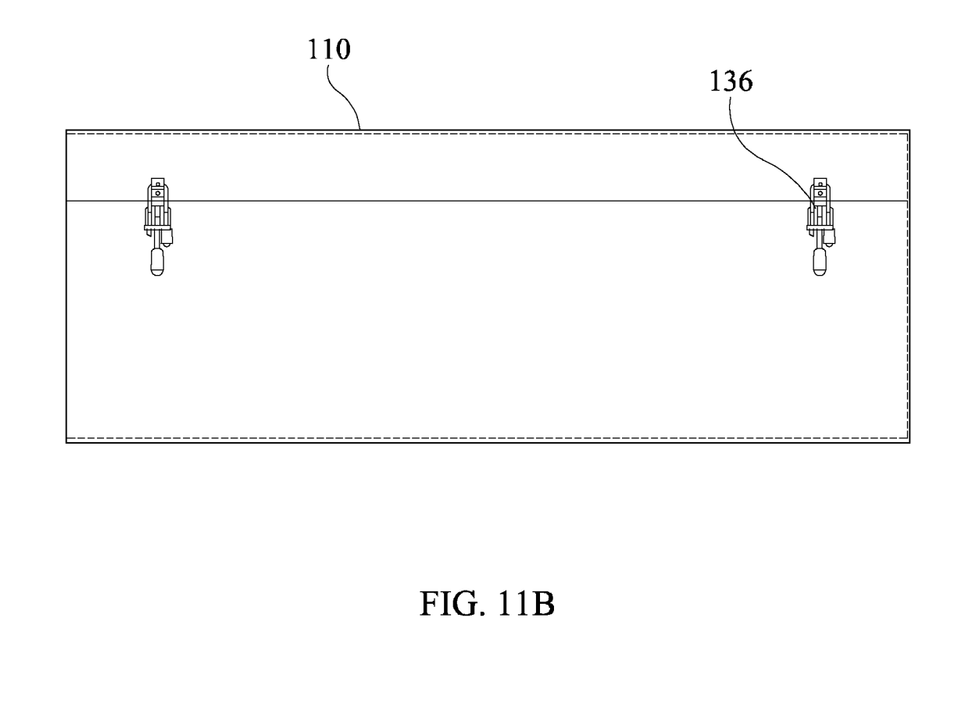

FIGS. 10 to 11B show another alternate embodiment of a filtration unit 100 and housing 110. In this embodiment, the filtration unit 100 is configured to be mountable to a floor or other ground structure. As with the embodiments shown in FIGS. 7 to 9B, in this embodiment, unit 100 can have, for example and without limitation, a rectangular housing 110 constructed of perforated stainless steel. The unit 100 includes caps 130 and 140. Cap 140 includes mounting flange 116 and collar 114 and cap 130 is attached at an opposing end of the unit 100. In this embodiment, flange 116 can be, for example and without limitation, round and centrally located on cap 140. Flange 116 is held in place by screws attached to inner cartridge 120 that protrude through the cap 140. The screws may be secured by wingnuts. Cap 130 includes adjustable mounts, for example adjustable feet 142, to attach unit 100 to a floor or other ground structure or to provide a base for unit 100. In the embodiment shown, caps 130 and 140 are also square and made of stainless steel.

As shown in FIG. 10, housing 110 is divided into two sections along the longitudinal axis A (NTD: Axis A doesn't appear in figures). The housing also includes fastening means, for example, toggle clamps 136 that secure the housing 110. In this embodiment, a user can remove the cap 140, and then open one of the sections of the housing 110 after disengaging the toggle clamps 136. The media cartridge 120 can then be replaced and the user can close the housing 110 by engaging toggle clamps 136, replacing the cap 140 and secure the unit 100. In this embodiment, the housing 100 is welded to cap 130. In this embodiment, media cartridge 120 includes screws on second cap 140. As described above, cap 140 may be fastened to the frame 112 of the housing, rather than the media cartridge 120. In such embodiments, it may be useful to provide a friction fit or seal between the cap 140 and the media cartridge 120, to prevent air seepage.

In the above embodiments, for example and without limitation, cartridge 120 is substantially cylindrical and is manufactured from perforated cold rolled steel.

The exemplary embodiments shown in FIGS. 1A to 11B can be manufactured from sheet metal and/or perforated sheet metal that is spot welded as necessary. Various other suitable materials and construction methods would be readily apparent to the person of skill having regard to the present description and are contemplated herein. In particular, it may be possible to replace some or all components of the invention with plastics, to reduce material costs. For example, it may be possible to manufacture the media cartridge 120 from injection moulded plastic, to reduce material costs.

The air filtration unit 100 can be used in various applications where there is a need to filter air. In a preferred embodiment, the filtration unit 100 is used in a greenhouse or hydroponic setting and includes activated charcoal filtration media to control odours or other emissions.

The embodiments of the present disclosure are intended to be examples only. Those of skill in the art may effect alterations, modifications and variations to the particular embodiments without departing from the intended scope of the present application.

For example, in some embodiments the filtration unit 100 is designed to operate in the opposite direction, such that air enters the filtration unit 100 at the outlet 108, passes through the central air passage 106 to the inner mesh 124 of the media cartridge 120, enters the media chamber 104 and passes through the filter media, exits the media cartridge 120 at the outer mesh 122, and exits the filtration unit 100 at the perforations 102 of the frame 112. In such embodiments, the pre-filter (not shown) may be located along the surface of the central air passage 106, or at another location upstream of the filtration unit 100.

Moreover, the frame 112 of the housing 110 may not extend along the full length of the media cartridge 120 and instead may stop short, such as at the center of mass for the cartridge 120, to reduce material costs. Likewise, the frame 112 may be of minimal construction, such as a cage-like arrangement of longitudinal and transverse members, rather than the perforations shown in FIGS. 1A to 1D.

Additionally, there are numerous configurations for the caps 130, 140 as described above. In some embodiments, the cap 130 may be a unitary component of the media cartridge 120, such that the cap 130 is formed by an extension of an end wall 123. Similarly, the cap 130 may be permanently attached to the media cartridge 120, rather than fastened to it.

Numerous means of fastening components together are also contemplated. For example, in some embodiments it may be preferable to replace the thumb screws 118 on the housing 110 and/or the thumb screws 132 with other types of fasteners, such as standard screws, bolts, and the like. Moreover, it is also possible to replace the fasteners with other fastening means, such as a threaded or twist-lock arrangement between the housing 110 and the media cartridge 120 and/or cap 130. Various other means for fastening would also be apparent to the person of skill in the art in view of this description and are also contemplated.

A variety of shapes are also contemplated for the filtration unit. Although the exemplary embodiments above are substantially cylindrical or rectangular, various shapes are contemplated including hemispheres, frustoconical shapes, nesting shapes, triangular prisms, rectangular prisms, and polygonal prisms having five to 10 sides, or more. Various other suitable shapes would be apparent to the person of skill in the art in view of the present description and are also contemplated.

Various air-permeable structures are also contemplated for the inner mesh 124, outer mesh 122, and frame 112. For example, these structures may be formed of plastic or metal and may comprise screens, fabrics, weaves, slatted structures, foam or other gas-permeable structures. In some embodiments, the filtration media (not shown) may be provided in a mesh fabric bag, which may reduce the need for structure on the inner mesh 124 and the outer mesh 122.

Numerous applications for the filtration unit 100 are contemplated, beyond a greenhouse or hydroponic setting. For example, an air filtration unit 100 according to the present invention may be useful in other applications in which the unit 100 is difficult to access, costly to replace, or must (for reasons of the application) be constructed from expensive materials such as metal.

Moreover, features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole. The subject matter described herein and in the recited claims intends to cover and embrace all suitable changes in technology.

The invention claimed is:

1. An air filtration unit comprising:
   a removable media cartridge having:
      an inner mesh defining a central air passage extending along a longitudinal axis of the filtration unit,
      an outer mesh surrounding the inner mesh,
      a pair of opposing end walls extending between the inner mesh and the outer mesh at opposing ends of the outer mesh, which together define a chamber between the inner and outer mesh, both of the pair of opposing end walls having attachment points,
      filtration media disposed in the chamber, and
      at least one cap for closing off one end of the central air passage in the media cartridge, the at least one cap comprising apertures positioned to correspond with the attachment points on one of the pair of opposing end walls for releasable securement with the one of the pair of opposing end walls; and
   a housing coaxial with said media cartridge, said housing having:
      a mounting flange for attachment of the filtration unit to an air vent, and
      a collar for receiving the media cartridge;
   wherein the housing comprises a frame for supporting the media cartridge along the longitudinal axis, and comprises an air permeable portion, and is configured such that when air flows through the outer mesh it also passes through the air permeable portion.

2. The filtration unit of claim 1, wherein the media cartridge further includes an alignment flange for insertion into the mounting flange of the housing.

3. The filtration unit of claim 1, wherein the frame extends along the longitudinal axis for at least 50% of the length of the outer mesh.

4. The filtration unit of claim 1, wherein the at least one cap is fastened to the media cartridge and is re-usable.

5. The filtration unit of claim 1, wherein the at least one cap receives the frame.

6. The filtration unit of claim 1, wherein the at least one cap is fastened to the frame.

7. The filtration unit of claim 1, wherein the at least one cap comprises a handle for insertion or removal of the media cartridge from the housing.

8. The filtration unit of claim 1, wherein the media cartridge is fastened to the collar of the housing.

9. The filtration unit of claim 1, wherein the frame is of mesh construction.

10. The filtration unit of claim 1 further comprising a second cap for partially closing off one end of the housing, wherein the second cap is fastened to the housing.

11. The air filtration unit of claim 1, wherein the air permeable portion is selected from the group consisting of a mesh, a screen, a fabric, a weave, a slatted, a foam, and a perforated portion.

12. The air filtration unit of claim 1, further comprising fasteners extending through the apertures of the at least one cap and the attachment points of the one of the pair of opposing end walls to releasably secure the at least one cap to the one of the pair of opposing end walls.

13. The air filtration unit of claim 1, wherein the other one of the pair of opposing end walls has further attachment points, and the collar comprises further apertures positioned to correspond with the further attachment points for releasable securement with the other one of the pair of opposing end walls.

14. The air filtration unit of claim 13, further comprising fasteners extending through the further apertures of the collar and the further attachment points of the other one of the pair of opposing end walls to releasably secure the collar to the other one of the pair of opposing end walls.

15. A removable media cartridge for use with an air filtration unit, the filtration unit having:
   a housing having:
      a mounting flange for attachment of the filtration unit to an air vent, and
      a collar for receiving the media cartridge;
      wherein the housing comprises a frame for supporting the media cartridge along the longitudinal axis, and comprises an air permeable portion, and is configured such that when air flows through the outer mesh it also passes through the air permeable portion;
   the media cartridge comprising:
      an inner mesh defining a central air passage extending along a longitudinal axis of the filtration unit;
      an outer mesh surrounding the inner mesh;
      a pair of opposing end walls extending between the inner mesh and the outer mesh at opposing ends of the outer mesh, which together define a chamber between the inner and outer mesh, both of the pair of opposing end walls having attachment points;
      filtration media disposed in the chamber; and
      a cap for closing off one end of the central air passage in the media cartridge, the cap comprising apertures positioned to correspond with the attachment points on one of the pair of opposing end walls for releasable securement with the one of the pair of opposing end walls.

16. The media cartridge of claim 15, wherein the media cartridge further includes an alignment flange for insertion into the mounting flange of the housing.

17. The media cartridge of claim 15, wherein the cap is fastened to the media cartridge and is re-usable.

18. The media cartridge of claim 15, wherein the cap and the media cartridge are of unitary construction.

19. The media cartridge of claim 15, wherein the cap comprises a handle for insertion or removal of the media cartridge from the housing.

20. The media cartridge of claim 15, wherein the media cartridge is for fastening to the collar of the housing.

21. The media cartridge of claim 15, wherein the air permeable portion is selected from the group consisting of a mesh, a screen, a fabric, a weave, a slatted, a foam, and a perforated portion.

22. A method of replacing the filtration media in the air filtration unit of claim 1, the method comprising:
- unfastening the media cartridge from the collar of the housing of the filtration unit;
- withdrawing the existing media cartridge from the collar of the housing;
- unfastening the at least one cap from the attachment points of one of the pair of opposing end walls of the media cartridge and fastening the at least one cap to one of a pair of opposing end walls of another media cartridge using the attachment points thereon;
- inserting the other one of the pair of opposing end walls of the another media cartridge into the collar of the housing; and
- fastening the other media cartridge to the collar of the housing.

23. The method of claim 22, further comprising the step of unfastening a cap on the existing media cartridge and fastening the cap to the replacement media cartridge.

* * * * *